United States Patent [19]

Manson et al.

[11] Patent Number: 4,772,447
[45] Date of Patent: Sep. 20, 1988

[54] DEVICE FOR THE SPACING AND HOLDING IN PLACE OF FUEL RODS IN A FUEL ASSEMBLY

[75] Inventors: Marcel Manson, Le Mesnil Saint Denis; Lioka Razafindrazaka, Montigny le Bretonneux, both of France

[73] Assignee: Commissariat a l'Energie Atomique, Paris, France

[21] Appl. No.: 120,239

[22] Filed: Nov. 3, 1987

Related U.S. Application Data

[63] Continuation of Ser. No. 820,319, Jan. 21, 1986, abandoned.

[30] Foreign Application Priority Data

Feb. 8, 1985 [FR] France ................. 85 01795

[51] Int. Cl.4 ............................................. G21C 3/34
[52] U.S. Cl. .................................. 376/441; 376/442; 376/462
[58] Field of Search ............ 376/442, 443, 446, 438, 376/439, 441, 436, 462

[56] References Cited

U.S. PATENT DOCUMENTS

| | | |
|---|---|---|
| 3,350,276 | 10/1967 | Warberg . |
| 3,753,855 | 8/1973 | Donck .............................. 376/441 |
| 3,762,996 | 10/1973 | Milburn et al. ..................... 376/442 |
| 3,769,159 | 10/1973 | Zinn et al. ....................... 376/438 X |
| 3,772,148 | 11/1973 | Seddon .............................. 376/441 |
| 4,081,324 | 3/1978 | Flora et al. ..................... 376/442 X |
| 4,190,494 | 2/1980 | Olsson . |
| 4,585,615 | 4/1986 | DeMario ........................ 376/443 X |

FOREIGN PATENT DOCUMENTS

| | | |
|---|---|---|
| 25392 | 3/1981 | European Pat. Off. ........... 376/441 |
| 1764625 | 9/1971 | Fed. Rep. of Germany . |
| 2168059 | 8/1973 | France . |
| 2531258 | 2/1984 | France . |
| 1153444 | 5/1969 | United Kingdom . |

Primary Examiner—John F. Terapane
Assistant Examiner—John S. Maples

[57] ABSTRACT

Device for the spacing and holding in place of fuel rods arranged in accordance with a mesh network in a nuclear reactor, incorporating a spacing structure having recesses regularly arranged in accordance with a mesh network superimposed on the mesh network of the rods, cylindrical sleeves formed from rings connected by elastic strips curved towards the inside of each sleeve and means for fixing the sleeves to said structure.

9 Claims, 6 Drawing Sheets

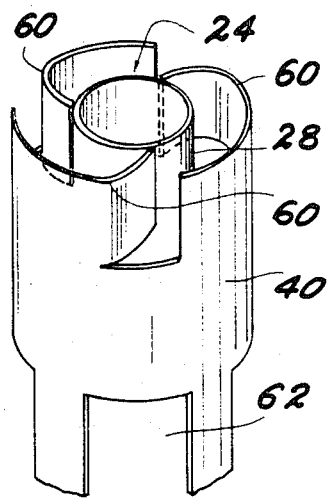
FIG.5a
FIG.5b
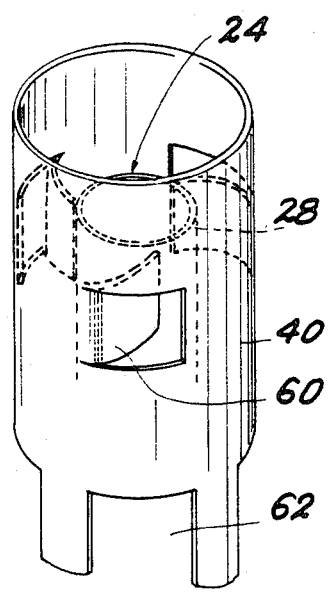
FIG.6
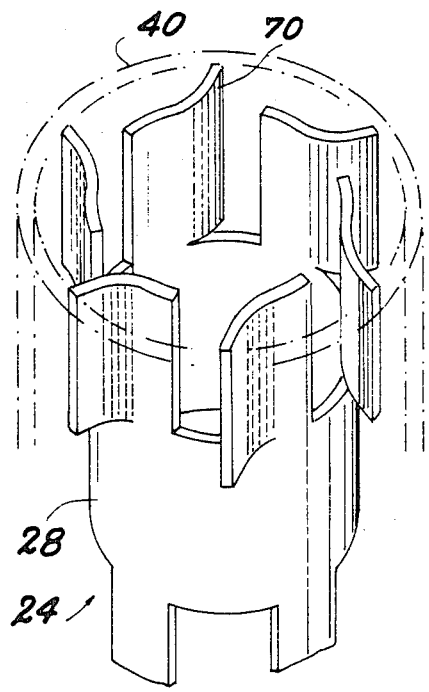

DEVICE FOR THE SPACING AND HOLDING IN PLACE OF FUEL RODS IN A FUEL ASSEMBLY

This application is a continuation of application Ser. No. 820,319, filed Jan. 21, 1986, now abandoned.

BACKGROUND OF THE INVENTION

The present invention relates to a device for the spacing and holding in place of fuel rods in a fuel assembly of a pressurized water nuclear reactor.

In a fuel assembly, the fuel rods are arranged in bundle form as illustrated in FIG. 1. The fuel rods 2 are arranged in grids 4, 4a, and 4b. Two plates called the lower end plate 10 and upper end plate 12 are positioned on either side of the ends of the rods. A device called a spider 14 supports the absorbing rods 16, which are introduced to a greater or lesser extent into guide tubes 18, in order to control the operating characteristics of the reactor. These guide tubes 18 are located in the position of a few fuel rods.

The grids or spacing devices 4, 4a, 4b have to fulfill a number of functions:
  the arrangement of the fuel rods in accordance with a precise, regular pattern, so that there is a sheet of water of given thickness between each rod to fulfill its two functions of neutron moderator and coolant;
  holding in place the fuel rods to prevent vibrations;
  axially supporting the fuel rods at their ends;
  an adequate mechanical strength and holding in place of the bundle in the case of transverse impacts between assemblies, e.g. resulting from an earthquake;
  a minimum hydraulic resistance to the outflow of the cooling liquid.

Conventionally, the assemblies of fuel rods have grids constituted by a system of recesses, where rigid supports such as bosses are provided, together with elastic supports such as springs exerting a force opposed to said bosses. Such an assembly is described in French Patent No. 2 168 059.

This type of assembly requires that the grids be sufficiently thick for the mechanical strength and rigidity to be adequate and this leads to a high hydraulic resistance. Moreover, the contacts between the grid and the fuel rods are relatively local. The guidance of the rods is consequently inadequate to prevent vibrations of said rods.

SUMMARY OF THE INVENTION

The present invention relates to a device for the spacing and holding in place of fuel rods arranged in a bundle in a nuclear reactor fuel assembly making it possible to obviate the aforementioned disadvantages.

According to the invention said device has a spacing structure defining a grid superimposed on the bundle of rods, cylindrical sleeves with rings connected by elastic strips curve towards the inside of each sleeve and means for fixing the sleeves to said structure.

According to a preferred embodiment of the invention, the spacing structure comprises recesses regularly arranged and fixing means between the recesses. The means for fixing the sleeves to the structure can then have rectangular tongues fixed on the one hand to the rings and on the other to the walls of the recesses.

According to a first variant of this embodiment, the fixing means between the recesses and for fixing the sleeves to the structure incorporate U-shaped parts secured by there ends to two adjacent sleeves and which overlap the walls of the recesses containing said adjacent sleeves, said parts being fixed to said walls.

According to a second variant of the preferred embodiment the means for fixing the sleeves to the structure incorporate connecting parts having tongues fixed to the rings of two adjacent sleeves and traversing the walls of the recesses containing said adjacent sleeves and an intermediate portion connecting said tongues.

According to a third variant of the preferred embodiment, the means for fixing the sleeves to the structure incorporate tongues cut from each recess and turned down towards the sleeve contained in each recess and fixed to the rings of said sleeve.

According to a fourth variant of the preferred embodiment, the means for fixing the sleeves to the structure incorporate tongues cut in the rings and turned towards the outside of the sleeve and fixed to the recesses.

In certain cases, the elastic strips are cut so as to form two half-sleeves.

Advantageously, at least one of the recesses is provided with windows in its central part.

According to another embodiment of the invention, the windows of the recesses are said to be deflecting and have lower and upper edges deformed in opposite directions towards the inside and outside of the recess.

According to another embodiment of the invention, the elastic strips of the sleeves have at least one collar projecting towards the inside of each sleeve and which is able to penetrate a groove of a fuel rod. One of the rings of each sleeve is advantageously fixed to the spacing structure constituted by an end plate ensuring the spacing and holding in place of the fuel rods.

BRIEF DESCRIPTION OF THE DRAWINGS

The invention is described in greater detail hereinafter relative to non-limitative embodiments and the attached drawings, wherein show:

FIGS. 5a and 5b, a perspective view of a third variant of the means for fixing the sleeves to the structure.

FIG. 6, a perspective view of a fourth variant of means for fixing sleeves to the structure.

DETAILED DESCRIPTION OF THE PREFERRED EMBODIMENTS

Figure 2:
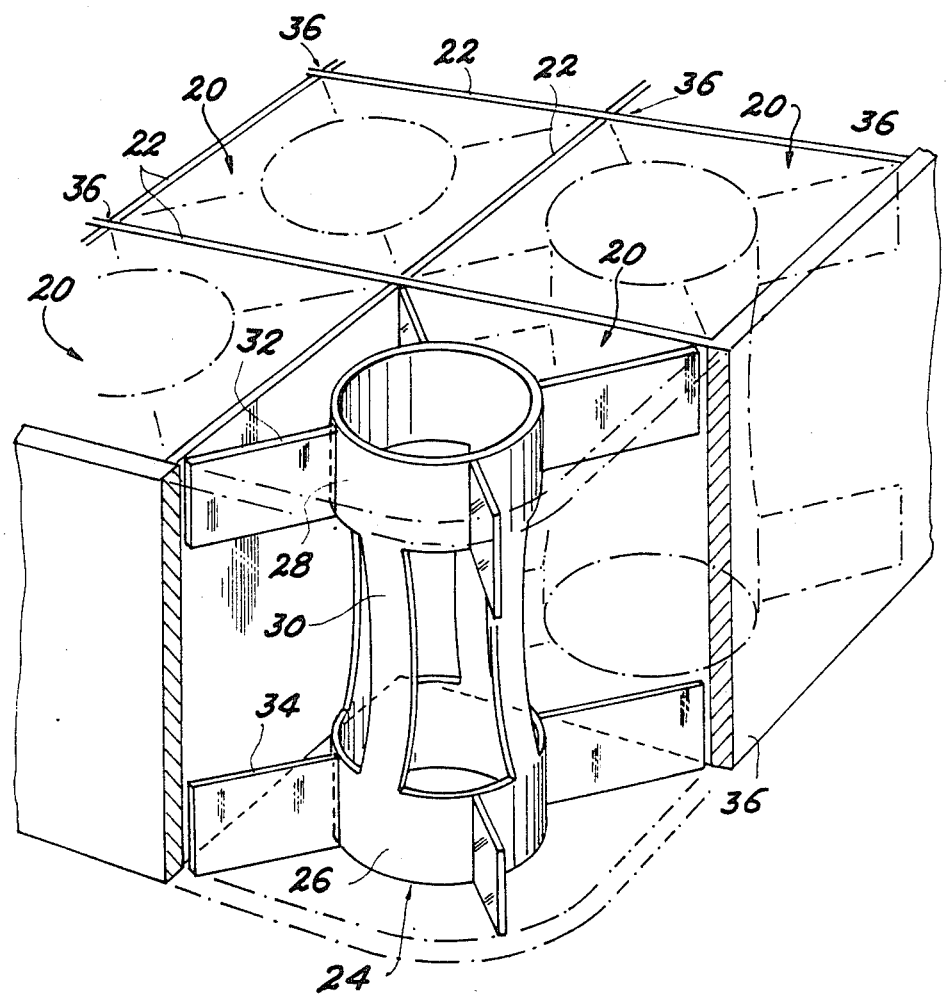
FIG. 2, a perspective view of a preferred embodiment of the device according to the invention.

FIG. 2 shows a preferred embodiment of a device for the spacing and holding in place of fuel rods called a grid 4.

The device comprises a spacing structure constituted by square recesses 20 arranged in a grid. The recesses are conventionally obtained by intercrossed plates 22. Each recess contains either a guide tube 18 (cf FIG. 1), or a cylindrical sleeve 24 for ensuring the positioning and holding in place of a fuel rod 2. At its ends, each sleeve 24 is constituted by two rings 26, 28 connected by e.g. four elastic strips 30, which are curved towards the inside of sleeve 24. The strips and rings are in one piece.

The two rings 28, 26 ensure the centering of fuel rod 2 (FIG. 1) in sleeve 24. The elastic strips 30 have a tightening or securing action on fuel rod 2 and thus permit its transverse maintaining in place and the damping of vibrations.

Each sleeve 24 is centered in the corresponding recess 20 by centering tongues 32, 34 welded to the corners of the recess 20 and to each ring 26, 28. The e.g. four tongues 32 are radially welded to ring 28. This also applies with regard to the four tongues 34, which are radially welded to ring 26.

Thus, the device according to the invention differs from conventional constructions in that the spacing and holding in place of the fuel rods are not ensured by rigid and elastic supports facing one another. Instead this function is fulfilled by rigid guidance means (rings 26, 28) and elastic members (strips 30) positioned all around the rods. Rings 26, 28 ensure the centering of the rods and elastic strips 30 permit the longitudinal holding in place of said rods by the tightening force which they exert on said rods.

Moreover, the presence of sleeves 24 in the grid recesses 20 associated with the centering tongues 32, 34 gives the devices or grids a clearly increased rigidity compared with grids formed solely from intercrossed plates 22 without sleeves 24.

Thus, as a result of this device it is possible to retain the same thickness for the plates as in the prior art and in this way obtain a better mechanical resistance to transverse forces (e.g. due to an earthquake) as a result of reinforcements constituted by the tongues. It is also possible to use thinner plates and consequently have a mechanical strength indentical to that of existing grids, whilst significantly reducing the hydraulic resistance.

The spacing and holding in place device can be used for fuel assemblies of all cross-sections and spacings. The choice of such a device makes it possible to obviate the problem created by the passage of guide tubes 18 (FIG. 1) in a prior art device, where it is necessary to simultaneously provide rigid supports and elastic supports.

The assembly of the grid according to the invention can take place in the following way. Tongues 32, 34 are welded to sleeves 24. Plates 22 are mounted to form a grid of square recesses 20. Sleeves 24 are introduced into said recesses and weld points are made at the intersections 36 of the grid thus at the same time joining together the plates and the tongues. The welds are e.g. made by laser or electron beam.

Figure 3:
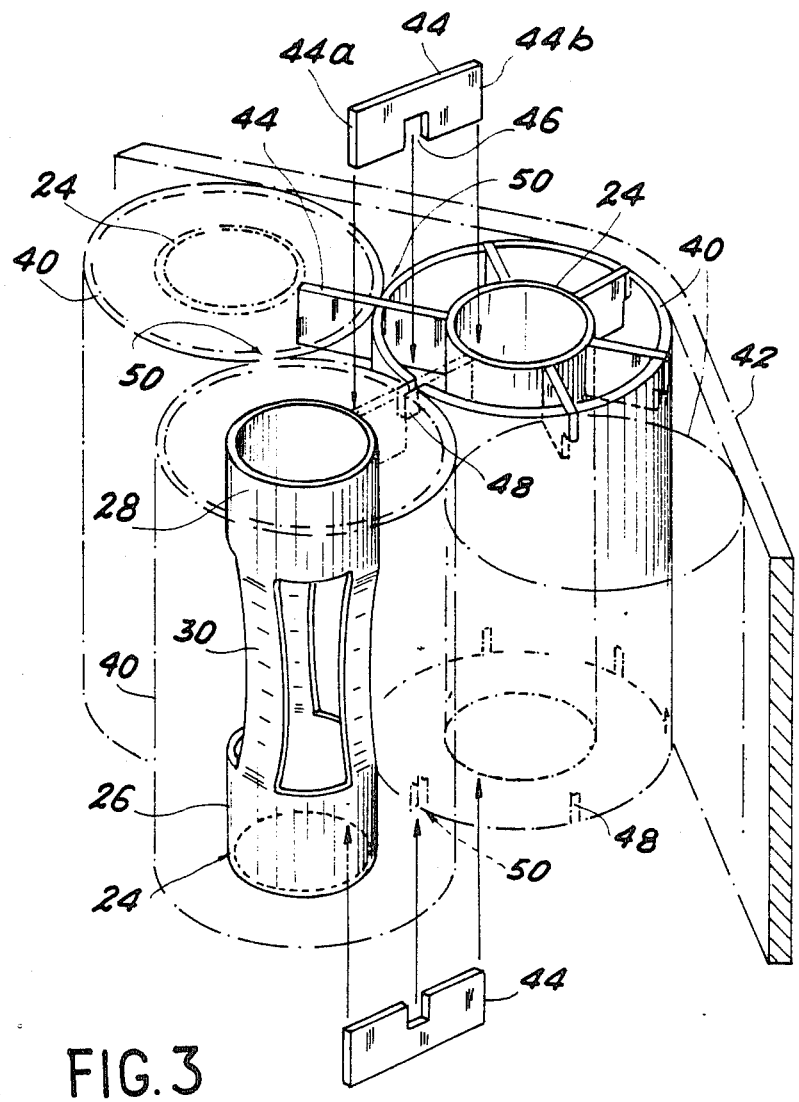
FIG. 3, a perspective view of a first variant of the means for fixing sleeves to the structure and fixing means between recesses.

FIG. 2 describes the grids according to the invention, in which the grid has square recesses. For example, it would also be possible to envisage cylindrical recesses arranged in accordance with a grid having a triangular spacing within a closed circle. The means for fixing the sleeves in the recesses are similar to those described hereinbefore. Consideration can be given to combining the means for fixing the sleeves to the structure and the fixing means between the recesses as shown in FIG. 3.

Cylindrical recesses 40 are arranged in accordance with a grid having a triangular spacing within a closed circle 42. U-shaped parts 44 are welded by there ends 44a, 44b to rings 26, 28 of two adjacent sleeves 24 and overlap the walls of their juxtaposed recesses 40 containing these adjacent sleeves 24. A half-slot 46 is made on each part 44 and is fitted into a corresponding half-slot 48 made in the wall of said recesses 40. There are e.g. six such parts 44 per recess. They are on the one hand responsible for the connection between juxtaposed recesses and on the other for the centering and fixing of the sleeves in the recesses.

Such a grid can be assembled as follows. Firstly the grid of recesses is assembled by arranging and welding parts 44 to the junction points 50 between the recesses. The sleeves 24 are then slid in and then welded to ends 44a, 44b of parts 44 at their respective rings 26, 28.

Figure 4:
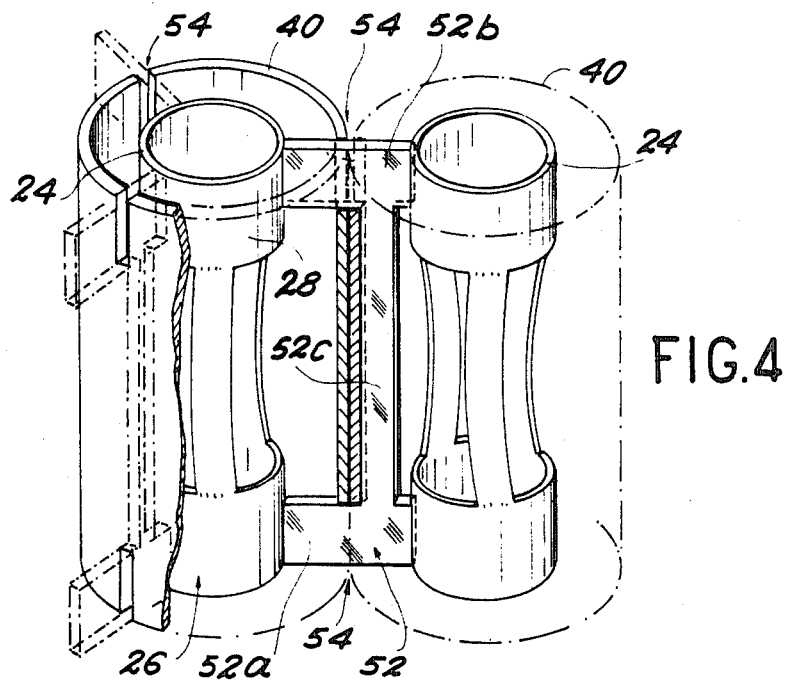
FIG. 4, a perspective view of a second variant of the means for fixing the sleeves to the structure.

Another constructional variant of the means for fixing sleeves 24 to recesses 40 is shown in FIG. 4. Two tongues 52a, 52b are fixed to the rings 26, 28 of two adjacent sleeves 24 and bear on the walls of the juxtaposed recesses 40 and are welded to the sleeves. An intermediate part 52c connects said two tongues 52a, 52b to form the single same part 52.

Assembly can take place in the following way. Initially the grid of recesses is assembled by arranging and welding parts 52 at the junction points 54 between recesses. Sleeves 24 are then slide in and welded to the ends of tongues 52a, 52b.

Such an arrangement makes it possible to ensure that the connecting part 52 cannot be detached under the action of the water current circulating at high speed between the rods. The shape of said part 52 ensures that it cannot move and lead to damage.

In the aforementioned embodiments, the means for fixing the sleeves to the recesses are constituted by loose or detachable parts. Consideration can also be given to cutting tongues 60 in the wall of recess 40 and then turning them down towards the inside of the recess, as shown in FIGS. 5a and 5b. The ends of these tongues are welded to rings 26, 28 of sleeve 24 contained in recess 40.

In FIG. 6, tongues 70 are cut in rings 26, 28 of sleeve 24 and then turned towards the outside of the sleeve, so as to be welded to the inside of the wall of recess 40 by their end.

In the case of square recesses, there will e.g. be four tongues which are cut from the sleeve.

Figure 7:
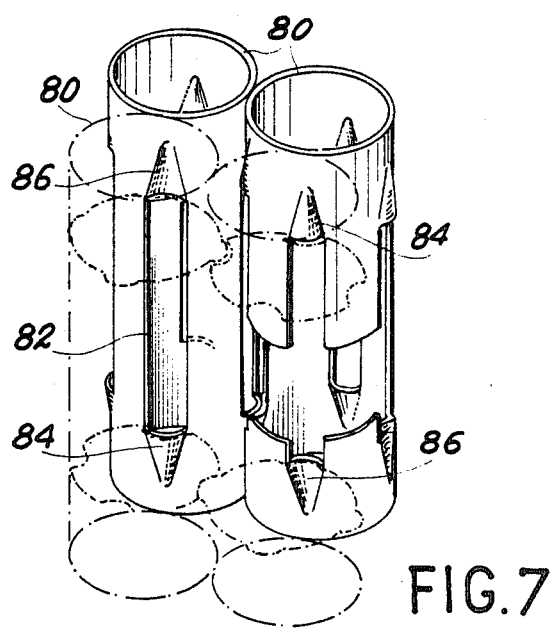
FIG. 7, a perspective view of another embodiment of the invention having deflecting windows.

In order to aid the cooling of fuel elements, it is recommended that turbulence be produced in the cooling fluid. The deflection of the hydraulic current is brought about through so-called deflecting windows 82 cut from the wall of the recesses (FIG. 7). Preferably conical deformations in opposite directions, towards the inside and outside of the recess are made on the lower edge 84 and upper edge 86 of the windows. These deformations made on facing windows of two juxtaposed recesses are compatible with one another, i.e. if the deformation is oriented towards the outside on the edge of one window, it must be oriented towards the inside on the adjacent recess. The means for fixing the sleeves in the recesses and the actual recesses are similar to those described hereinbefore.

Preferably the sleeves are made from an alloy based on zirconium of the zircalloy type. This material has the special feature of a total stress relief under irradiation. The tightening action exerted by the elastic strips 30 can therefore disappear during operation.

Figure 1:
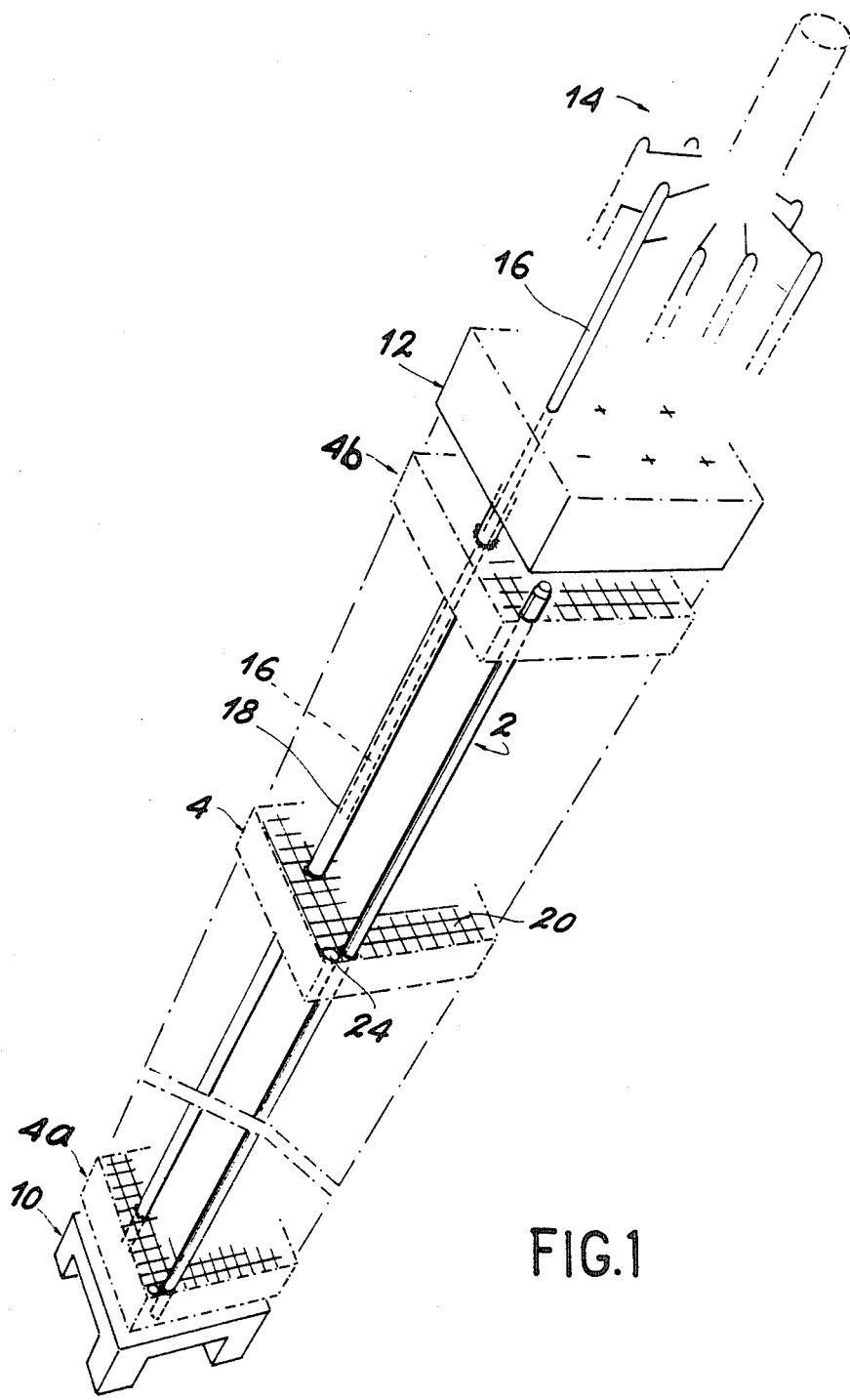
FIG. 1, already described, in perspective an overall view of a fuel assembly incorporating devices according to the invention.
Figure 8:
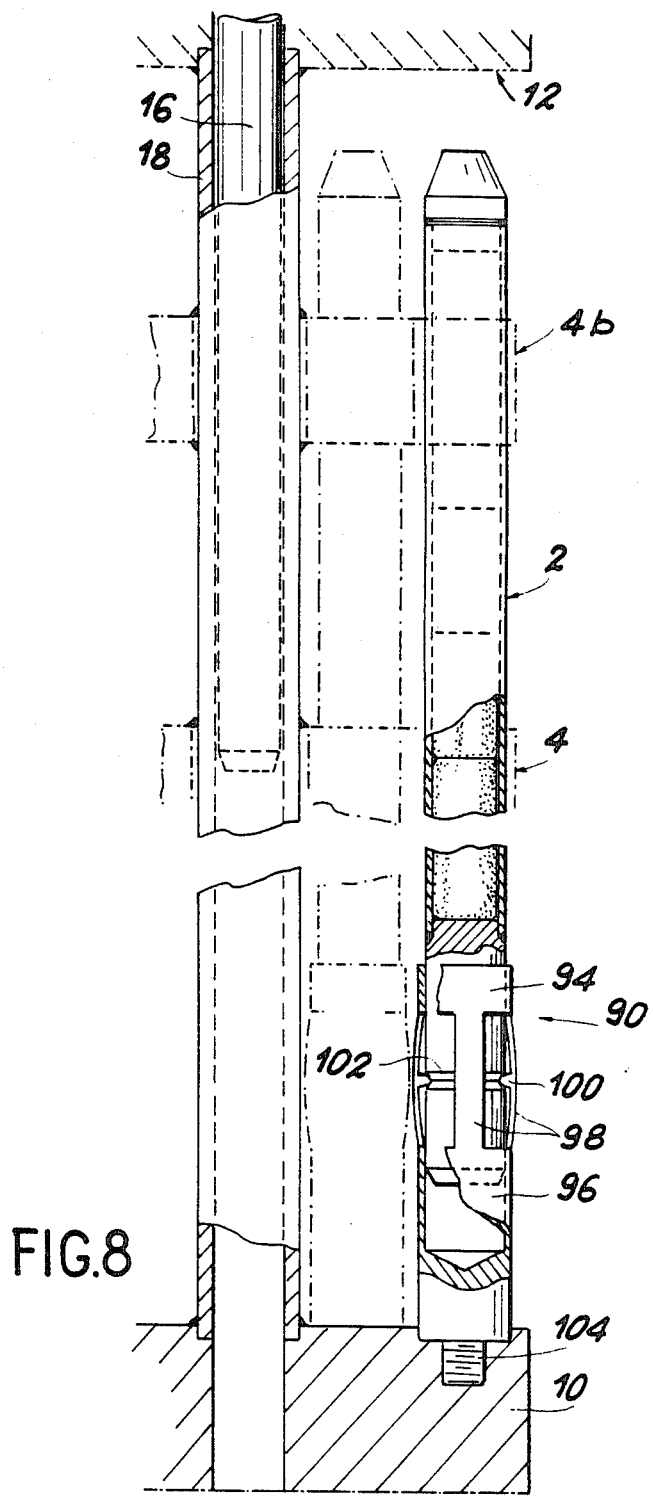
FIG. 8, a perspective view of another embodiment of the invention illustrating the fixing of the ends of the fuel rods.

To ensure the axial holding in place of the rods, the grid 4a in FIG. 1 which is normally located in the vicinity of the lower end plate 10 is eliminated and replaced by sleeves 90 according to the invention, which secure each fuel rod 2 and are rendered integral with said plate 10, as shown in FIG. 8.

Each sleeve 90 incorporates two rings 94, 96 connected by elastic strips 98 curved towards the inside of the sleeve. These strips 98 have a small collar 100 projecting towards the inside of the sleeve. Collar 100 is located in a groove 102 machined on the end of fuel rod 2. Ring 96 at the end of the rod is extended so as to form a threaded end 104, which is screwed into the lower end plate 10. Sleeves 90 screwed onto plate 10 ensure a rigid spacing and axial maintaining in place of the fuel rods, even under irradiation, due to the collaboration of collars 100 and grooves 102. FIG. 8 also shows a guide tube 18 according to FIG. 1.

Thus, grid 4a (FIG. 1) can be replaced by such a device, which leads to a considerable improvement to the hydraulic resistance of the assembly. It is obviously possible to have several collars and several associated grooves on the the same sleeve - rod assembly.

In the same way, grid 4b in FIG. 1 normally positioned in the vicinity of the upper end plate 12 can be replaced by a device similar to that described hereinbefore.

Figure 9:
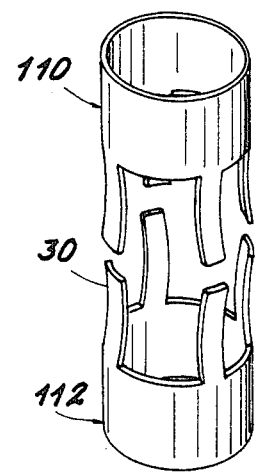
FIG. 9, a perspective view of two half-sleeves.

FIG. 9 shows two half-sleeves 110 and 112. In order to produce these, a sleeve according to the invention, such as sleeve 24 of FIG. 2, is cut in the centre of elastic strips 30. The use of two half-sleeves makes it possible to eliminate the longitudinal force appearing in the sleeve during the moving away of the elastic strips when the fuel rods are introduced.

Obviously the above description has been given in an exemplified manner and modifications can be envisaged to the embodiments described without modifying the fundamental principle of the invention.

For example, windows can be cut in the walls of the recesses without them being of a deflecting nature. In FIGS. 5a and 5b, the rectangular windows 62 are consequently cut in the central portion of recesses 40.

What is claimed is:

1. A device for spacing and holding in place nuclear fuel rods in a fuel assembly, said device comprising: a grid structure having walls defining a plurality of adjacent recesses spaced from each other, a plurality of cylindrical sleeves, with one sleeve per recess, each sleeve comprising two rings spaced one above the other for receiving and centering therein a fuel rod wherein each said two rings exert no tightening or damping action on the fuel rod, a plurality of elastic strips interconnecting said rings of each sleeve and being curved inwardly for exerting a tightening and damping action on the fuel rod in the sleeve, and means fixing each sleeve to the walls defining the respective recess so as to leave a space around each sleeve within said grid structure.

2. A device according to claim 1, wherein said fixing means comprises rectangular tongues fixedly connecting said rings to the walls of the respective recess.

3. A device according to claim 1, wherein said fixing means comprise U-shaped parts fixedly interconnecting two adjacent sleeves and overlapping the walls of the recesses containing said adjacent sleeves, said parts being fixed to said walls.

4. A device according to claim 1, wherein said fixing means comprise connecting parts, each of said parts having two tongues fixedly interconnecting the rings of two adjacent sleeves, said tongues traversing walls of the recesses containing said adjacent sleeves, each of said connecting parts further having an intermediate part fixedly interconnecting said tongues.

5. A device according to claim 1, wherein said fixing means comprise tongues cut from the walls of the recesses, turned towards the sleeve contained in the respective recess, and fixed to the rings of said sleeve.

6. A device according to claim 1, wherein said fixing means comprise tongues cut in the rings, turned outwardly towards the outside of the sleeve and fixed to the walls of the respective recess.

7. A device according to claim 1, wherein the elastic strips are cut so as to form two half-sleeves.

8. A device according to claim 1, wherein at least one of the walls has windows in a central part thereof.

9. A device according to claim 8, wherein the windows have upper and lower edges deformed in opposite directions towards the outside and inside of the recess.

* * * * *